Dec. 17, 1957     H. G. IRWIN     2,816,537
ARCHERY BOW

Filed Dec. 3, 1956     2 Sheets-Sheet 1

Dec. 17, 1957   H. G. IRWIN   2,816,537
ARCHERY BOW
Filed Dec. 3, 1956   2 Sheets-Sheet 2

United States Patent Office 2,816,537
Patented Dec. 17, 1957

2,816,537

ARCHERY BOW

Herbert G. Irwin, Noble, La.

Application December 3, 1956, Serial No. 625,807

4 Claims. (Cl. 124—24)

This invention relates to an archery bow, and contemplates a bow provided with a bow string drawhand guide bar for locating the bow string in the proper drawn-back position for shooting an arrow and affording an anchor shoulder for the drawhand, whereby steady shooting may be done with less side-thrust on the arrow shaft.

Other objects and advantages of this invention will appear throughout the following specification and claims.

In the drawing accompanying and forming a part of this specification.

Figure 1:
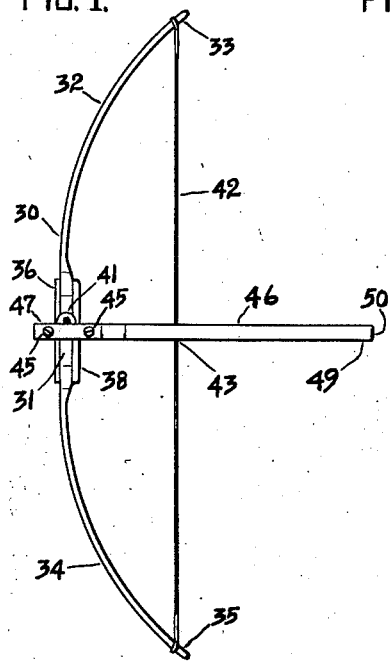
Figure 1 is a left side elevational view of an archery bow provided with a righthand drawhand guide bar for locating the bow string in the drawn-back position for shooting an arrow.
Figure 2:
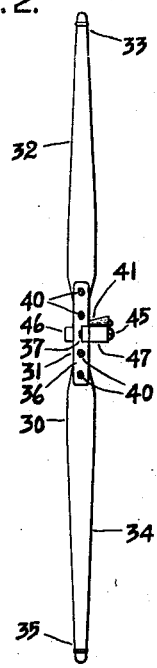
Figure 2 is a front side elevational view of the bow shown in Figure 1.

Upon reference to Figures 1, 2, 3 and 4 of the drawing it will be noted that 30 indicates an archery bow including a middle portion 31 between upper and lower limbs 32 and 34 and the bow limbs have ends 33 and 35 adapted to hold opposite ends of a taut bow string 42 for shooting an arrow over an arrow rest 41 on the middle portion of the bow. The middle portion of the bow is reinforced with front and rear lug-bars 36 and 38, and screws 40 and 40 which extend through perforations in the front lug-bar 36, perforations in the middle portion of the bow, and into threaded perforations in the rear lug-bar 38. The lug-bars have integral front and rear bar-lugs 37 and 39 provided with threaded perforations to receive the threaded ends of guide bar attachment screws 45 and 45. The bow is provided with a righthand drawhand guide bar 46 for locating the bow string in the drawn-back position 44 a little to the right for shooting an arrow straight over the arrow rest located on the left side of the bow. The middle portion of the bow can be wrapped with suitable tape at 31 under the front end portion of the guide bar or otherwise covered at 31 to afford a good grip for holding the bow in the left hand. The bow shown is made of suitable wood, but a bow made of other suitable material can be employed. The lug-bars can be made of forgings or castings of suitable metal, or made of steel with the lugs welded on. Lug-bars made of suitable plastic can be employed on a small bow. Front and rear lugs for attaching the front end of the guide bar with bolts can be formed integral with a molded bow stock which can be made of suitable molding material. Integral lugs can be employed on a bow stock formed of suitable plastic or synthetic resin reinforced with glass filaments or fibers.

Figure 3:
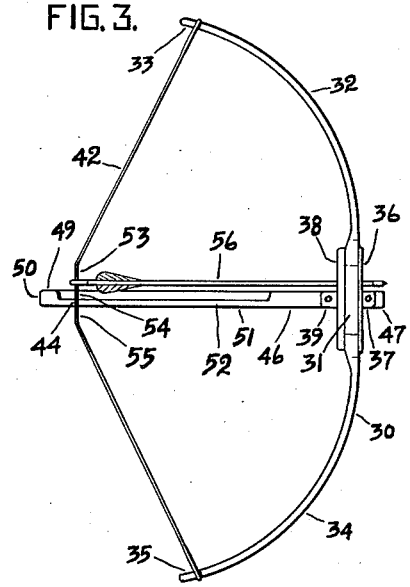
Figure 3 is a right side elevational view of the bow showing the bow string located in the drawn-back position for shooting an arrow. An arrow is shown as it would be held notched on the bow string with the first and second fingers of the drawhand to the end of the draw.
Figure 4:
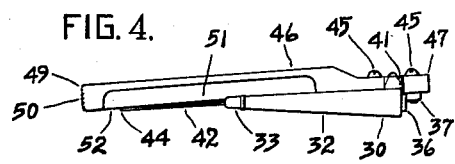
Figure 4 is an upper end plan view of the bow with the bow string drawn back to the shooting position as shown in Figure 3. The arrow is removed to show where the drawn-back bow string may be released on the edge of the guide bar to shoot an arrow.
Figure 5:
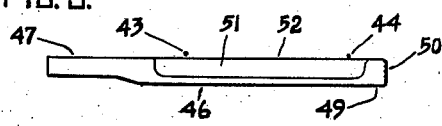
Figure 5 is an upper side plan view of the form of drawhand guide bar shown in Figures 1, 2, 3 and 4.
Figure 6:
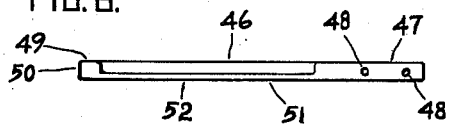
Figure 6 is a right side elevational view of the guide bar shown in Figure 5.
Figure 7:
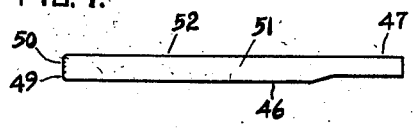
Figure 7 is an under side plan view of the guide bar shown in Figures 5 and 6.
Figure 8:
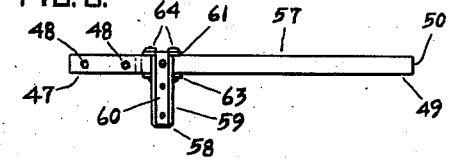
Figure 8 is a left side elevational view of a righthand drawhand guide bar provided with a handle for the left hand.
Figure 9:
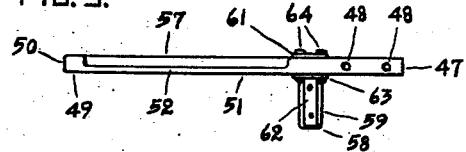
Figure 9 is a right side elevational view of the guide bar shown in Figure 8.
Figure 10:
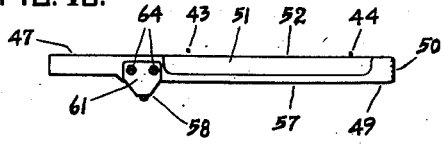
Figure 10 is an upper side plan view of the guide bar shown in Figures 8 and 9.
Figure 11:
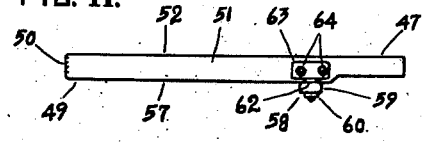
Figure 11 is an under side plan view of the guide bar shown in Figures 8, 9 and 10.
Figure 12:
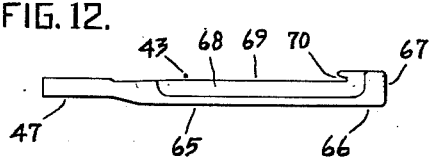
Figure 12 is an upper side plan view of a righthand drawhand guide bar provided with a notch to aid in locating the bow string in the drawn-back position for shooting an arrow.
Figure 13:
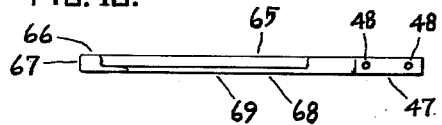
Figure 13 is a right side elevational view of the guide bar shown in Figure 12.
Figure 14:
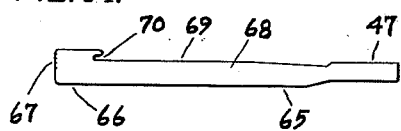
Figure 14 is an under side plan view of the guide bar shown in Figures 12 and 13.
Figure 15:
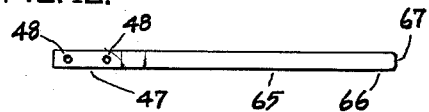
Figure 15 is a left side elevational view of the guide bar shown in Figures 12, 13 and 14.

Drawhand guide bar 46, shown in more detail in Figures 5, 6 and 7, has a perforated front end portion 47, a rear end portion 49 at the rear of the drawn-back position 44 of the bow string, and a thinned finger slide portion 51 between the front and rear portions. Perforations 48 and 48 receive the attachment screws 45 and 45, and the front end portion of the guide bar is attachable rigidly with the middle portion of the bow as shown in Figures 1, 2, 3 and 4 to present a blunt edge 52 of the finger slide portion transversely and near the bow string stretched taut at position 43 between the ends of the bow as shown in Figures 1 and 5. The finger slide portion is thinned to slip between the tips of the second and third fingers of the drawhand for guiding the drawhand in drawing back the bow string with an arrow notched on the bow string and held between the first and second fingers of the drawhand. With a shooting glove on the drawhand, the bow string can be drawn back with the first three fingers of the drawhand latched onto the bow string so that the tips of the second and third fingers will straddle the finger slide edge 52, and at the end of the draw, the heel of the drawhand can be anchored on the drawhand anchor shoulder 50 on the rear end of the guide bar while taking aim. In making the draw, the left side of the guide bar near the rear end can be placed against the upper part of the right hip or placed against the body above the right hip. In Figure 3, numeral 53 indicates where, in making a draw to shoot an arrow, the first finger of the drawhand is latched onto the bow string, the second finger of the drawhand is latched onto the bow string at 54, the third finger at 55, and the nock end of the arrow 56 is shown where it is held between the first and second fingers of the drawhand.

Drawhand guide bar 57 shown in Figures 8, 9, 10 and 11, has a front end portion 47 including perforations 48 and 48, a rear end portion 49 including a drawhand anchor shoulder 50, a thinned finger slide portion 51 including a blunt edge 52 between the front and rear end portions, and a handle 58 located at the front end of the finger slide portion. Handle 58 includes a body portion 59 riveted between metal strips 60 and 62 the latter having spaced clamp portions 61 and 63 embracing the guide bar and clamped with bolts 64. If preferred, a rigid plastic handle with integral clamp portions of rigid plastic may be employed on the bar in the place of handle 58. Guide bar 57 can be employed on bow 30 in the place of guide bar 46, and the bow can be held in an uprightly shooting position with an extended hand gripped on handle 58, and the bow string can be drawn back to the shooting position with less reach.

Drawhand guide bar 65 shown in Figures 12, 13, 14 and 15, has a front end portion 47 including perforations 48 and 48, a rear end portion 66 including a drawhand anchor shoulder 67, a thinned finger slide portion 68 including a blunt edge 69 between the front and rear end portions, and a forwardly opened notch 70 located at the rear end of the finger slide portion to aid in locating the bow string in the drawn-back position. If preferred, the finger slide portion may be made tapering in thickness from the front bow string position 43 to a little thinner at the rear end, to afford some relief toward the rear end of the finger slide as the bow string bends and presses on the third finger of the drawhand on the draw. Guide bar 65 can be employed on bow 30 in the place of guide bar 46, and the bow string can be drawn back quickly to the bottom of notch 70 which is the drawn-back position for releasing the bow string. The drawn-back bow string can be released when the bottom of the notch 70 is reached, or by anchoring the heel of the drawhand on the anchor shoulder 67 the bow string can be held against the bottom of the notch 70 while taking aim.

Figure 17:
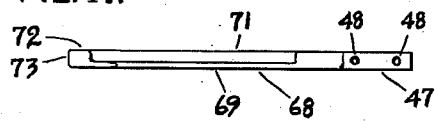
Figure 17 is a right side elevational view of the guide bar shown in Figure 16.
Figure 16:
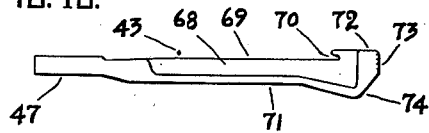
Figure 16 is an upper side plan view of a righthand drawhand guide bar provided with a notch to receive the bow string in the drawn-back position, and a rest projection for resting the guide bar against the body while taking aim to shoot an arrow.
Figure 18:
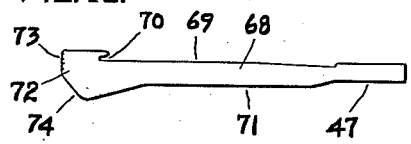
Figure 18 is an under side plan view of the guide bar shown in Figures 16 and 17.
Figure 21:
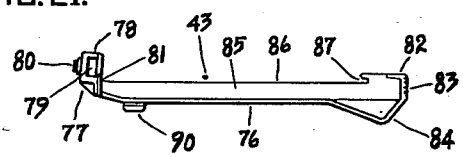
Figure 21 is an upper side plan view of the guide bar shown in Figures 19 and 20.

Drawhand guide bar 71 shown in Figures 16, 17 and 18, has a front end portion 47 including perforations 48 and 48, a rear end portion 72 including a drawhand anchor shoulder 73, a thinned finger slide portion 68 including a blunt edge 69 between the front and rear end portions, a forwardly opened notch 70 located at the rear end of the finger slide portion to aid in locating the bow string in the drawn-back position, and a rest projection 74 adjacent to the anchor shoulder for resting the guide bar against the body while taking aim. Guide bar 71 can be employed on bow 30 in the place of guide bar 46, and with the bow string drawn back to notch 70 and the heel of the drawhand anchored on the anchor shoulder 73, steady aim can be taken when the rest projection 74 is placed against the body below the chin.

Figure 19:
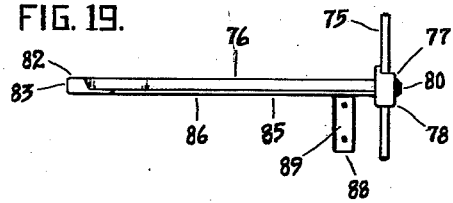
Figure 19 is a right side elevational view of a righthand drawhand guide bar having a front end portion attachable rigidly with the middle portion of a metal bow.
Figure 20:
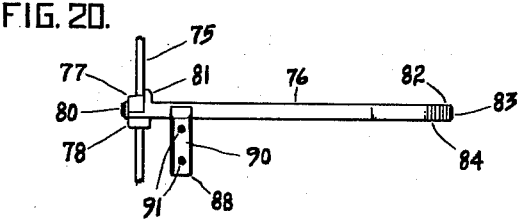
Figure 20 is a left side elevational view of the guide bar shown in Figure 19.
Figure 23:
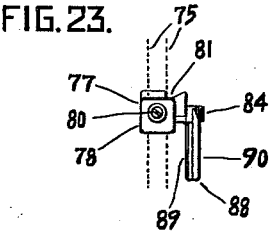
Figure 23 is a front end elevational view of the guide bar shown in Figures 19, 20, 21 and 22.
Figure 22:
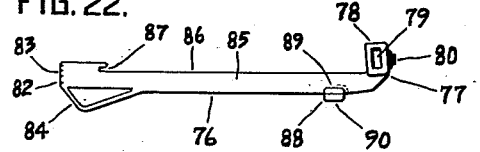
Figure 22 is an under side plan view of the guide bar shown in Figures 19, 20 and 21.
Figure 24:
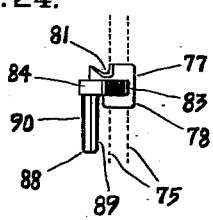
Figure 24 is a rear end elevational view of the guide bar shown in Figures 19, 20, 21, 22, 23 and 24.

Drawhand guide bar 76 shown in Figures 19, 20, 21, 22, 23 and 24, has a front end portion 77 attachable rigidly with the middle portion 75 of a metal bow, a rear end portion 82 including a drawhand anchor shoulder 83, a thinned finger slide portion 85 including a blunt edge 86 between the front and rear end portions, a forwardly opened notch 87 located at the rear end of the finger slide portion to aid in locating the bow string in the drawn-back position, a handle 88 located at the front end of the finger slide portion for holding the bow in an uprightly shooting position with an extended hand, and a rest projection 84 adjacent to the anchor shoulder for resting the guide bar against the body while taking aim. Front end portion 77 includes an arrow rest 81, an offset sleeve 78 having a passageway 79 sized to receive the middle portion 75 of a bow as shown in Figures 19 and 20 and the middle portion of a bow is indicated by broken lines 75 in Figures 23 and 24, and a set-screw 80 for clamping the middle portion of a bow rigidly in the sleeve. Numeral 43 in Figure 21 indicates the front position of the bow string stretched taut between the ends of a metal bow having its middle portion clamped rigidly in sleeve 78. Handle 88 includes a body portion 90 attached with screws 91 to the side of a handle projection 89 integral with the guide bar.

All of guide bar 76 except set-screw 80 and handle body portion 90, can be made from a casting of suitable light metal. Guide bar 57 except the metal strips and clamp portions of handle 58, can be made of suitable wood or suitable plastic. Guide bars 46, 65 and 71 can be made of suitable wood or suitable plastic. Close range shooting can be done with a bow provided with any one of the guide bars shown, but better aim can be taken and longer range shooting can be done better with a suitable front sight on the bow and a rear sight on the bow string. Bow sights shown in the drawing of application Serial Number 620,090, filed November 2, 1956, can be employed on a bow provided with any one of the drawhand guide bars shown, and shooting can be done without elevating the drawhand above the shoulder.

In shooting a bow provided with the drawhand guide bar, the bow string is drawn back to a position which is offset enough that the released bow string will drive an arrow shaft over the arrow rest without side-thrusting arrow shaft hard enough against the bow to knock much curve or deflection in the arrow shaft.

I claim:

1. An archery bow provided with a bow string drawhand guide bar including a front end portion attached rigidly with the middle portion of said bow, a rear end portion at the rear of the drawn-back position of the bow string, a thinned finger slide portion between said front and rear end portions and presenting a blunt edge transversely and near the bow string stretched taut between the ends of said bow, said finger slide portion thinned to slip between the tips of the second and third fingers of the drawhand in drawing back the bow string with an arrow notched on the bow string and held between the first and second fingers of the drawhand, and a drawhand anchor shoulder for anchoring the drawhand in holding the bow string in the drawn-back position on the first three fingers of the drawhand while taking aim, said anchor shoulder located on the rear end portion of said guide bar adjacent to the rear end of said finger slide portion.

2. An archery bow provided with a bow string drawhand guide bar including a front end portion attached rigidly with the middle portion of said bow, a rear end portion at the rear of the drawn-back position of the bow string, a thinned finger slide portion between said front and rear end portions and presenting a blunt edge transversely and near the bow string stretched taut between the ends of said bow, said finger slide portion thinned to slip between the tips of the second and third fingers of the drawhand in drawing back the bow string with an arrow notched on the bow string and held between the first and second fingers of the drawhand, and a drawhand anchor shoulder for anchoring the drawhand in holding the bow string in the drawn-back position on the first three fingers of the drawhand while taking aim, said anchor shoulder located on the rear end portion of said guide bar adjacent to the rear end of said finger slide portion, and a handle for holding the bow in an uprightly shooting position with an extended hand, said handle located at the front end of said finger slide portion.

3. An archery bow provided with a bow string drawhand guide bar including a front end portion attached rigidly with the middle portion of said bow, a rear end portion at the rear of the drawn-back position of the bow string, a thinned finger slide portion between said front and rear end portions and presenting a blunt edge transversely and near the bow string stretched taut between the ends of said bow, said finger slide portion thinned to slip between the tips of the second and third fingers of the drawhand in drawing back the bow string with an arrow notched on the bow string and held between the first and second fingers of the drawhand, a forwardly opened notch in the edge of said finger slide portion to aid in locating the bow string in the drawn-back position, said notch located at the rear end of said finger slide portion, and a drawhand anchor shoulder for anchoring the drawhand in holding the bow string in the drawn-back position on the first three fingers of the drawhand while taking aim, said anchor shoulder located on the rear end portion of said guide bar adjacent to the rear end of said finger slide portion.

4. An archery bow provided with a bow string drawhand guide bar including a front end portion attached rigidly with the middle portion of said bow, a rear end portion at the rear of the drawn-back position of the bow string, a thinned finger slide portion between said front and rear end portions and presenting a blunt edge transversely and near the bow string stretched taut between the ends of said bow, said finger slide portion thinned to slip between the tips of the second and third fingers of the drawhand in drawing back the bow string with an arrow notched on the bow string and held between the first and second fingers of the drawhand, a forwardly opened notch in the edge of said finger slide portion to aid in locating the bow string in the drawn-back position, said notch located at the rear end of said finger slide portion, a drawhand anchor shoulder for anchoring the drawhand in holding the bow string in the drawn-back position on the first three fingers of the drawhand while taking aim, said anchor shoulder located on the rear end portion of said guide bar adjacent to the rear end of said finger slide portion, and a rest projection for resting the guide bar against the body while taking aim, said rest projection located adjacent to said anchor shoulder.

References Cited in the file of this patent

UNITED STATES PATENTS

| 1,584,729 | Cates | May 18, 1926 |
| 1,605,300 | Thompson | Nov. 2, 1926 |
| 2,664,078 | Irwin | Dec. 29, 1953 |
| 2,714,884 | Ickes | Aug. 9, 1955 |

FOREIGN PATENTS

| 672,262 | Great Britain | May 21, 1952 |